US011190820B2

(12) United States Patent
Han et al.

(10) Patent No.: US 11,190,820 B2
(45) Date of Patent: *Nov. 30, 2021

(54) FIELD OF VIEW PREDICTION IN LIVE PANORAMIC VIDEO STREAMING

(71) Applicant: AT&T Intellectual Property I, L.P., Atlanta, GA (US)

(72) Inventors: Bo Han, Bridgewater, NJ (US); Matteo Varvello, Holmdel, NJ (US); Vijay Gopalakrishnan, Edison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/825,667

(22) Filed: Mar. 20, 2020

(65) Prior Publication Data

US 2020/0221149 A1 Jul. 9, 2020

Related U.S. Application Data

(63) Continuation of application No. 15/995,842, filed on Jun. 1, 2018, now Pat. No. 10,623,791.

(51) Int. Cl.
*H04N 21/25* (2011.01)
*H04N 5/232* (2006.01)
(Continued)

(52) U.S. Cl.
CPC ....... *H04N 21/251* (2013.01); *H04N 5/23238* (2013.01); *H04N 21/234363* (2013.01);
(Continued)

(58) Field of Classification Search
CPC ......... H04N 21/234363; H04N 21/251; H04N 21/41407; H04N 21/44218; H04N 21/816
(Continued)

(56) References Cited

U.S. PATENT DOCUMENTS 5,611,038 A 3/1997 Shaw et al.
6,665,002 B2 12/2003 Liu
(Continued)

FOREIGN PATENT DOCUMENTS

CN 106919248 A 7/2017
GB 2538531 A 11/2016
(Continued)

OTHER PUBLICATIONS

"360 Degree Video Streaming Over Next-Gen Communication Networks", NYU Wireless, wireless.engineering.nyu.edu, Apr. 7, 2017.

(Continued)

*Primary Examiner* — Nasser M Goodarzi
*Assistant Examiner* — Jaycee Imperial
(74) *Attorney, Agent, or Firm* — Guntin & Gust, PLC; Kenneth S. Kwan

(57) ABSTRACT

Aspects of the subject disclosure may include, for example, a method including providing a video presentation to user devices. A latency related to the video presentation is determined for each device; a high-latency user device is identified having greater latency than other, low-latency devices. Field of view information is analyzed for each of the low-latency devices; based on the analyzing, a field of view of the high-latency user device is predicted. In accordance with the predicting, a predicted viewing map for the high-latency user device is generated. The video presentation for the high-latency user device is adjusted based on the predicted viewing map. Other embodiments are disclosed.

20 Claims, 10 Drawing Sheets

CONTENT SOURCES 175
MEDIA TERMINAL 142
MEDIA ACCESS 140
144
NE 156
NE 150
NE 154
NE 152
COMMUNICATIONS NETWORK 125
WIRELESS ACCESS 120
122
124
126
BROADBAND ACCESS 110
ACCESS TERMINAL 112
114
VOICE ACCESS 130
SWITCHING DEVICE 132
134
100

(51) Int. Cl.
*H04N 21/414* (2011.01)
*H04N 21/2343* (2011.01)
*H04N 21/442* (2011.01)
*H04N 21/81* (2011.01)

(52) U.S. Cl.
CPC . *H04N 21/41407* (2013.01); *H04N 21/44218* (2013.01); *H04N 21/816* (2013.01)

(58) Field of Classification Search
USPC .......................................................... 725/10
See application file for complete search history.

(56) References Cited

U.S. PATENT DOCUMENTS 7,428,022 B2 9/2008 Teichner et al.
7,817,181 B2 10/2010 Lee
8,379,670 B2 2/2013 Le et al.
8,947,498 B2 2/2015 Wang
9,131,257 B2 9/2015 Russo et al.
9,311,692 B1 4/2016 Jia et al.
9,321,703 B2 4/2016 Nyce et al.
9,392,102 B2 7/2016 Zhou
9,554,160 B2 1/2017 Han et al.
9,589,255 B1 3/2017 Sandrew
9,589,434 B2 3/2017 Siann et al.
9,621,871 B2 4/2017 Toma et al.
9,635,252 B2 4/2017 Accardo et al.
9,648,318 B2 5/2017 Li et al.
9,686,520 B2 6/2017 Degtyarev et al.
9,699,437 B2 7/2017 Cole et al.
9,710,973 B2 7/2017 Bar-Zeev et al.
9,787,896 B2 10/2017 Fink et al.
9,813,465 B2 11/2017 Petria et al.
9,813,673 B2 11/2017 Smits
9,847,079 B2 12/2017 Clement et al.
9,897,807 B2 2/2018 Giokaris et al.
9,912,717 B2 3/2018 Ha et al.
9,918,136 B2 3/2018 Cole et al.
9,929,879 B2 3/2018 Herrero
2003/0233464 A1 12/2003 Walpole et al.
2006/0013495 A1 1/2006 Duan et al.
2006/0135258 A1* 6/2006 Maheshwari ........... G07F 17/32 463/42
2007/0019740 A1 1/2007 Budagavi et al.
2007/0036544 A1 2/2007 Fukashiro et al.
2007/0263904 A1 11/2007 Muramatsu
2011/0069147 A1 3/2011 Lin et al.
2011/0216833 A1 9/2011 Chen et al.
2012/0206452 A1* 8/2012 Geisner ................... H04S 7/304 345/419
2012/0291080 A1 11/2012 Mccutchen et al.
2014/0013361 A1 1/2014 Monari et al.
2014/0247324 A1 9/2014 Cury et al.
2014/0267420 A1 9/2014 Schowengerdt et al.
2014/0313989 A1 10/2014 Doken et al.
2014/0351835 A1 11/2014 Orlowski
2015/0023430 A1 1/2015 Choi et al.
2015/0063211 A1 3/2015 Kim et al.
2015/0271493 A1 9/2015 Okazaki
2015/0312582 A1 10/2015 Minoo et al.
2015/0346812 A1 12/2015 Cole et al.
2015/0363976 A1* 12/2015 Henson ................ H04N 13/279 345/419
2016/0027141 A1 1/2016 Patel et al.
2016/0073023 A1 3/2016 Rondinelli et al.
2016/0088282 A1 3/2016 Sadi et al.
2016/0100332 A1 4/2016 Yi et al.
2016/0150212 A1 5/2016 Moura et al.
2016/0260196 A1 9/2016 Roimela et al.
2016/0277772 A1 9/2016 Campbell et al.
2016/0286251 A1 9/2016 Kopka
2016/0352791 A1 12/2016 Adams et al.
2016/0360180 A1 12/2016 Cole et al.
2016/0373725 A1 12/2016 Pastor
2017/0078351 A1 3/2017 Von Sneidern et al.
2017/0078921 A1 3/2017 Xia et al.
2017/0085484 A1 3/2017 Hollander et al.
2017/0094261 A1 3/2017 Teslenko
2017/0115488 A1 4/2017 Ambrus et al.
2017/0126416 A1 5/2017 Mccormick et al.
2017/0188058 A1 6/2017 Nakashima et al.
2017/0220816 A1 8/2017 Matusek et al.
2017/0223395 A1* 8/2017 Elliot ............. H04N 21/234345
2017/0244948 A1 8/2017 Pang et al.
2017/0251204 A1 8/2017 Gupte et al.
2017/0287446 A1* 10/2017 Young ..................... G06F 3/013
2017/0289219 A1 10/2017 Khalid et al.
2017/0316543 A1 11/2017 Pieters
2017/0318126 A1 11/2017 Breitenfeld et al.
2017/0332117 A1 11/2017 Haritaoglu et al.
2017/0336705 A1 11/2017 Zhou et al.
2017/0339391 A1 11/2017 Zhou et al.
2017/0339415 A1 11/2017 Wang et al.
2017/0344843 A1 11/2017 Wang et al.
2017/0347026 A1 11/2017 Hannuksela
2017/0347084 A1 11/2017 Boyce
2017/0352191 A1 12/2017 Zhou
2017/0359586 A1 12/2017 Xue et al.
2017/0374127 A1 12/2017 Hosur
2017/0374375 A1 12/2017 Makar et al.
2017/0374411 A1 12/2017 Lederer et al.
2018/0020204 A1 1/2018 Pang et al.
2018/0027258 A1 1/2018 Tech et al.
2018/0035134 A1 2/2018 Pang et al.
2018/0081149 A1 3/2018 Bae et al.
2018/0130323 A1 5/2018 Zhang
2018/0139434 A1 5/2018 Roe et al.
2018/0146216 A1 5/2018 Chang et al.
2018/0191868 A1 7/2018 Wang et al.
2018/0191952 A1 7/2018 Ardo et al.
2018/0242392 A1* 8/2018 Liu ....................... H04L 45/125
2018/0359189 A1 12/2018 Ye et al.
2019/0005575 A1 1/2019 Zeldin et al.
2019/0058856 A1 2/2019 Bostick et al.
2019/0324440 A1 10/2019 Cella et al.
2019/0373298 A1 12/2019 Han et al.
2019/0379875 A1 12/2019 Gopalakrishnan et al.
2020/0007905 A1 1/2020 Han et al.
2020/0053390 A1 2/2020 Han et al.

FOREIGN PATENT DOCUMENTS

KR 101808639 B1 1/2018
WO 9321703 A1 10/1993
WO 9742601 A1 11/1997
WO 2015183887 A1 12/2015
WO 2016058279 A1 4/2016
WO 2017093611 A1 6/2017
WO 2017140945 A1 8/2017
WO 2017140948 A1 8/2017
WO 2017205642 A1 11/2017
WO 2017205794 11/2017
WO 2018004239 A1 1/2018
WO 2018011054 A1 1/2018
WO WO-2018000185 A1 * 1/2018 ............ H04W 84/20
WO 2018041244 3/2018
WO 2018049221 3/2018

OTHER PUBLICATIONS

Afzal, Shahryar et al., “Characterization of 360-degree Videos”, VR/AR Network ’17, Aug. 25, 2017, Los Angeles, CA, USA, Association for Computing Machinery, ACM ISBN 978-1-4503-5055-6/17/08, Jun. 17, 08.

Bao, Yanan et al., “Motion-Prediction-Based Multicast for 360-Degree Video Transmissions”, IEEE, 2017, 9 pages.

Bao, Yanan, “Shooting a Moving Target: Motion-Prediction-Based Transmission for 360-Degree Videos”, 2016 IEEE International Conference on Big Data, 10 pages.

Boos, Kevin et al., “FlashBack: Immersive Virtual Reality on Mobile Devices via Rendering Memoization”, MobiSys’16, Jun.

(56) References Cited

OTHER PUBLICATIONS 25-30, 2016, Singapore, Singapore ACM. ISBN 978-1-4503-4269, Aug. 16, 2006.
Budagavi, Madhukar et al., "360 Degrees Video Coding Using Region Adaptive Smoothing", 2015 IEEE, Samsung Research America, Dallas Northwestern University, Evanston, IL, 2015, 5 pages.
Corbillon, et al., "Optimal Set of 360-Degree Videos for Viewport-Adaptive Streaming", MM '17, Oct. 23-27, 2017, Mountain View, CA, 9 pages.
Corbillon, et al., "Viewport-Adaptive Navigable 360-Degree Video Delivery", 2017 IEEE International Conference, 7 pages.
Corbillon, Xavier et al., "360-degree video head movement dataset", Proceedings of the 8th ACM on Multimedia Systems Conference, ACM, 2017, 6 pages.
De Cock, Jan et al., "A Large-Scale Video Codec Comparison of x264, x265 and libvpx for Practical VOD Applications", Applications of Digital Image Processing XXXIX, 2016, 17 pages.
Duanmu, Fanyi et al., "Prioritized Buffer Control in Two-tier 360 Video Streaming", In Proceedings of VR/AR Network '17, Los Angeles, CA, USA, Aug. 25, 2017, 6 pages.
Fan, Ching-Ling et al., "Fixation Prediction for 360 Video Streaming in Head-Mounted Virtual Reality", In Proceedings of NOSSDAV'17, Taipei, Taiwan, Jun. 20-23, 2017, 6 pages., Jun. 20, 2017, 6 pages.
Farr, Kieran, "Using Microservices and Containers for Video Encoding", bitmovin.com, Mar. 23, 2018.
Gaddam, Vamsidhar et al., "Tiling in Interactive Panoramic Video Approaches and Evaluation", IEEE Transactions on Multimedia, vol. 18, No. 9, Sep. 2016, 13 pages.
Graf, Mario et al., "Towards bandwidth efficient adaptive streaming of omnidirectional video over http: Design, implementation, and evaluation", Proceedings of the 8th ACM on Multimedia Systems Conference, ACM, 2017.
Hamza, Ahmed et al., "Adaptive Streaming of Interactive Free Viewpoint Videos to Heterogeneous Clients", MMSys '16, May 10-13, Klagenfurt, Austria, ACM, ISBN 978-1-4503-4297, Jan. 16, 2005.
Hosseini, et al., "Adaptive 360 VR video streaming based on MPEG-DASH SRD", Multimedia (ISM), 2016 IEEE International Symposium, IEEE, 2016, 2 pages.
Hosseini, et al., "Adaptive 360 VR Video Streaming: Divide and Conquer", 2016 IEEE International Symposium, 4 pages.
Hosseini, et al., "Adaptive 360 VR video streaming: Divide and conquer", Multimedia (ISM), 2016 IEEE International Symposium, IEEE, 2016, 6 pages.
Huang, Te-Yuan et al., "A Buffer-Based Approach to Rate Adaptation Evidence from a Large Video Streaming Service", SIGCOMM'14, Aug. 17-22, 2014, Chicago, Illinois, USA., 2014, 12 pages.
Inoue, Masayuki et al., "Interactive Panoramic Video Streaming System over Restricted Bandwidth Network", Proceedings of the 18th ACM international conference on Multimedia. ACM, 2010., 2010, 4 pages.
Jiang, Junchen et al., "Improving Fairness, Efficiency, and Stability in HTTP-based Adaptive Video Streaming with FESTIVE", CoNEXT'12, Dec. 10-13, 2012, Nice, France, Dec. 2012, 97-108.
Ju, Ran et al., "Ultra Wide View Based Panoramic VR Streaming", In Proceedings of VR/AR Network '17, Los Angeles, CA, USA, Aug. 25, 2017, 5 pages.
Kammachi-Sreedhar, Kashyap et al., "Viewport-adaptive Encoding and Streaming of 360-degree Video for Virtual Reality Applications", 2016 IEEE International Symposium on Multimedia, 4 pages.
Lai, Zeqi et al., "Furion: Engineering High-Quality Immersive Virtual Reality on Today's Mobile Devices", MobiCom'17, Oct. 16-20, 2017, Snowbird, UT, USA.Association for Computing Machinery. ACM ISBN 978-1-4503-4916-1/17/10., Jan. 17, 2010.
Le Feuvre, Jean et al., "Tiled-based Adaptive Streaming using MPEG-DASH", MMSys'16, May 10-13, 2016, Klagenfurt.
Li, Jiwei et al., "Smartphone-Assisted Smooth Live Video Broadcast on Wearable Cameras", Quality of Service (IWQoS), 2016 IEEE/ACM 24th International Symposium, IEEE, 2016., 2016, 6 pages.
Li, Tianxing et al., "Ultra-Low Power Gaze Tracking for Virtual Reality", SenSys '17, Nov. 6-8, 2017, Netherlands, 14 pages.
Liu, et al., "360 Innovations for Panoramic Video Streaming", Proceedings of the 16th ACM Workshop on Hot Topics in Networks, ACM, 2017, 7 pages.
Liu, Xing et al., "360° Innovations for Panoramic Video Streaming", Proceedings of the 16th ACM Workshop on Hot Topics in Networks. ACM, 2017., 2017, 7 pages.
Lo, Wen-Chih et al., "360 Video Viewing Dataset in Head-Mounted Virtual Reality", 2017 ACM, 2017, 6 pages.
Lo, Wen-Chih, "Performance Measurements of 360 Video Streaming to Head-Mounted Displays Over Live 4G Cellular Networks", Accessed Jul. 25, 2018, 6 pages.
Mangiante, Simone et al., VR is on the Edge: How to Deliver 360 degrees Videos in Mobile Networks; Conference: the Workshop, researchgate.net, DOI: 10.1145/3097895.3097901, (Aug. 2017), pp. 1-18.
Mao, Hongzi et al., "Neural Adaptive Video Streaming with Pensieve", SIGCOMM '17, Los Angeles, CA, USA, Aug. 21, 2017, 14.
Nasrabadi, et al., "Adaptive 360-Degree Video Streaming using Scalable Video Coding", MM '17, October 23027, 2017, Mountain View, CA, ISBN 978-1-4503-4909, Feb. 7, 2010.
Nasrabadi, et al., "Adaptive 360-Degree Video Streaming using Scalable Video Coding", Proceedings of the 2017 ACM on Multimedia Conference, ACM, 2017, 9 pages.
Nasrabadi, Afshin T., "Adaptive 360-Degree Video Streaming using Layered Video Coding", IEEE Virtual Reality, Mar. 18-22, 2017, 347-348.
NG, Kinig-To et al., "Data Compression and Transmission Aspects of Panoramic Videos", IEEE Transactions on Circuits and Systems for Video Technology 15.1 (2005): 82-95., Jan. 2005, 15 pages.
Ochi, Daisuke et al., "HMD Viewing Spherical Video Streaming System", MM'14, Nov. 3-7, 2014, Orlando, Florida, USA., Nov. 3, 2014, 2.
Ochi, Daisuke et al., "Live Streaming System for Omnidirectional Video", IEEE Virtual Reality Conference, Aires, France, Mar. 23, 2015.
Petrangeli, Stefano et al., "An HTTP/2-BASED Adaptive Streaming Framework for 360 Virtual Reality Videos", Proceedings of the 2017 ACM on Multimedia Conference, ACM, 2017., Oct. 23-27, 2017, 9 pages.
Qian, Feng et al., "Optimizing 360 Video Delivery Over Cellular Networks", Proceedings of the 5th Workshop on All Things Cellular: Operations, Applications and Challenges, ACM, 2016., Oct. 3-7, 2016, 6 pages.
Rai, Yashas et al., "A Dataset of Head and Eye Movements for 360 Degree Images", MMSys'17, Taipei, Taiwan; 2017 ACM., 2017, 6 pages.
Sanchez, Yago et al., "Spatio-Temporal Activity based Tiling for Panorama Streaming", NOSSDAV'17, Jun. 20-23, 2017, Taipei, Taiwan., 6 pages.
Toni, Laura et al., "Interactive Free Viewpoint Video Streaming Using Prioritized Network Coding", Multimedia Signal Processing (MMSP), 2013 IEEE 15th International Workshop, IEEE, 2013., Sep. 30, 2013, 6 pages.
Van Den Broeck, Marc et al., "It's All Around You: Exploring 360 Video Viewing Experiences on Mobile Devices", MM'17, Oct. 23-27, 2017, Mountain View, CA, USA, 2017, 7.
Wang, "LIAITHON: A location-aware multipath video streaming scheme for urban vehicular networks", Computers and Communications (ISCC), 2012 IEEE Symposium, IEEE, 2012, 6 pages.
Wang, Hui et al., "Mixing Tile Resolutions in Tiled Video: A Perceptual Quality Assessment", NOSSDAV'14, Mar. 19-21, 2014, Singapore, Singapore., Mar. 19, 2014, 6.
Wu, Chenglei et al., "A Dataset for Exploring User Behaviors in VR Spherical Video Streaming", MMSys'17, Taipei, Taiwan; 2017 ACM., 2017, 6 pages.
Wu, Po-Han et al., "Video-Quality-Driven Resource Allocation for Real-Time Surveillance Video Uplinking Over OFDMA-Based

(56) References Cited

OTHER PUBLICATIONS

Wireless Networks", IEEE Transactions on Vehicular Technology 64.7 (2015) 3233-3246., Jul. 2015, 14 pages.
Xiao, et al., "OpTile: Toward Optimal Tiling in 360-degree Video Streaming", In Proceedings of MM '17, Mountain View, CA, USA, Oct. 23-27, 2017,, 9 pages.
Xie, Lan et al., "360ProbDASH: Improving QoE of 360 Video Streaming Using Tile-based HTTP Adaptive Streaming", 2017 Association for Computing Machinery., 2017, 9 pages.
Xie, Xiufeng et al., "POI360: Panoramic Mobile Video Telephony over LTE Cellular Networks", CoNEXT '17, Dec. 12-15, 2017, Incheon, Republic of Korea, 2017, 14 pages.
Yin, Xiaoqi et al., "A Control-Theoretic Approach for Dynamic Adaptive Video Streaming over HTTP", SIGCOMM '15, Aug. 17-21, 2015, London, United Kingdom; 2015 ACM, 2015, 14 pages.
Yu, Matt et al., "A Framework to Evaluate Omnidirectional Video Coding Schemes", 2015 IEEE International Symposium on Mixed and Augmented Reality, 6 pages.
Zare, Alireza et al., "HEVC-compliant Tile-based Streaming of Panoramic Video for Virtual Reality Applications", MM '16, Oct. 15-19, 2016, Amsterdam, Netherlands, Oct. 15, 2016, 5.
Zhao, et al., "SDN-Assisted adaptive streaming framework for tile-based immersive content using MPEG-DASH", Network Function Virtualization and Software Defined Networks (NFV-SDN), 2017 IEEE Conference, 6 pages.
Zhou, Chao , "A Measurement Study of Oculus 360 Degree Video Streaming", MMSys'17, Jun. 20-23, 2017, Taipei, Taiwan, 11 pages.

* cited by examiner

201

203

204

205

600

FIELD OF VIEW PREDICTION IN LIVE PANORAMIC VIDEO STREAMING

CROSS REFERENCE TO RELATED APPLICATIONS

This application is a continuation of U.S. application Ser. No. 15/995,842, filed Jun. 1, 2018, which is incorporated herein by reference in its entirety.

FIELD OF THE DISCLOSURE

The subject disclosure relates to video streaming services, and more particularly to a system for predicting a user's field of view (FoV) when the user is watching a live panoramic video presentation.

BACKGROUND

A panoramic or immersive (360°) video presentation generally includes scenes recorded by omnidirectional cameras or camera arrays. Since a user has only a limited field of view (FoV), at least some of the presented content is not actually viewed. In the particular case of a live panoramic video presentation, delivery of video content to certain users may be delayed by different time periods ("latency").

BRIEF DESCRIPTION OF THE DRAWINGS

Reference will now be made to the accompanying drawings, which are not necessarily drawn to scale, and wherein.

DETAILED DESCRIPTION

Figure 1:
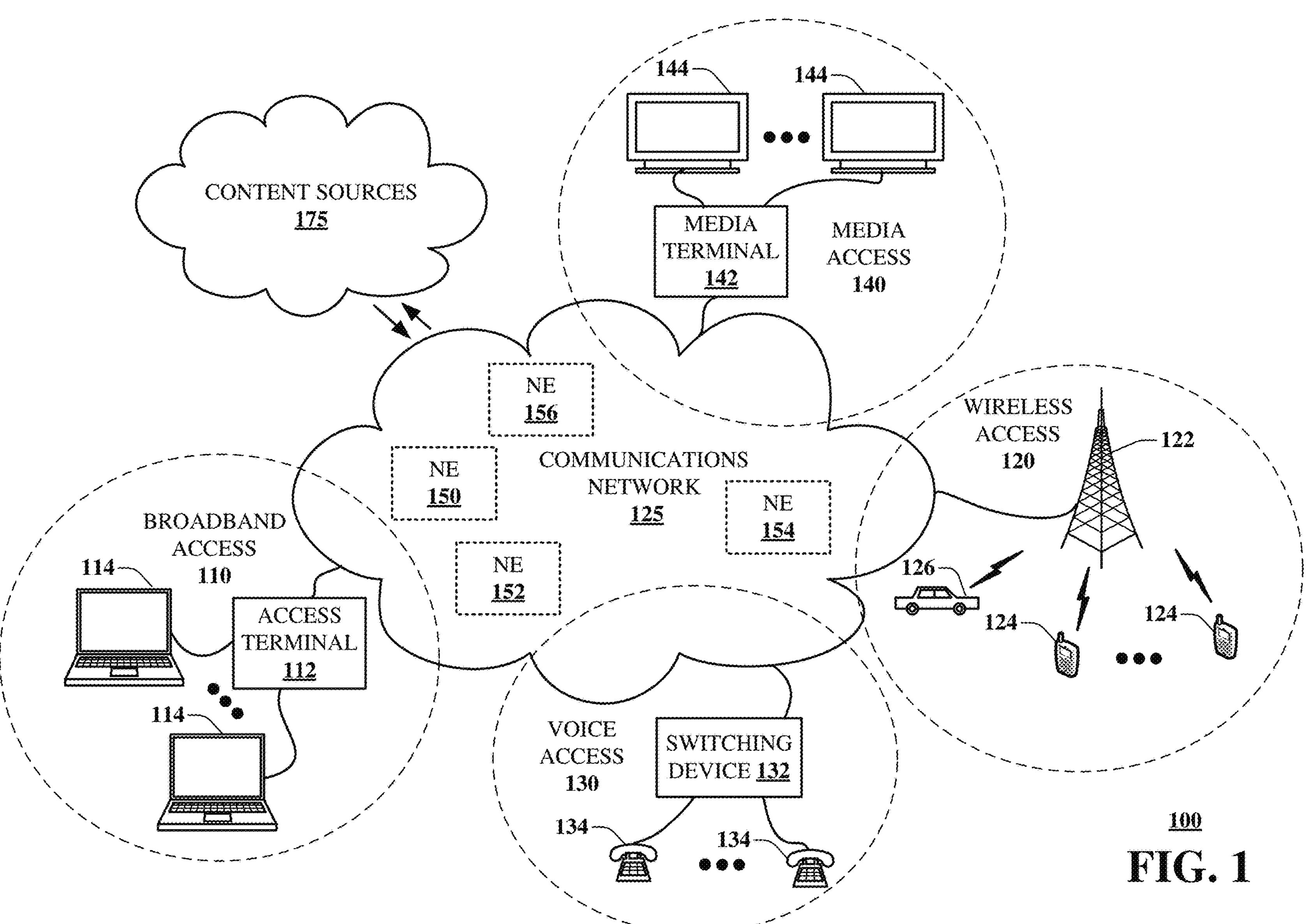
FIG. 1 is a block diagram illustrating an example, non-limiting embodiment of a communications network in accordance with various aspects described herein.

The subject disclosure describes, among other things, illustrative embodiments for providing live panoramic video content to devices experiencing relatively high latency. Other embodiments are described in the subject disclosure.

One or more aspects of the subject disclosure include a method comprising providing, by a processing system including a processor, a video presentation over a network for viewing at a plurality of user devices. The method also comprises determining a latency related to the video presentation for each of the plurality of user devices resulting in a group of latencies being determined, and identifying a high-latency user device of the plurality of user devices; a particular latency of the group of latencies corresponding to the high-latency user device is greater than other latencies of the group of latencies corresponding to other user devices of the plurality of user devices. The method further comprises analyzing field of view (FoV) information of each of the other user devices; predicting, based on the analyzing, a field of view of the high-latency user device; generating, in accordance with the predicting, a predicted viewing map for the high-latency user device; and adjusting the video presentation for the high-latency user device based on the predicted viewing map. The predicted viewing map comprises a first region outside the predicted field of view of the high-latency viewing device and, in accordance with the adjusting, video data corresponding to the first region is omitted from the video presentation for the high-latency user device.

One or more aspects of the subject disclosure include a device comprising a processing system including a processor, and a memory that stores executable instructions that, when executed by the processing system, facilitate performance of operations. The operations comprise providing a video presentation over a network for viewing at a plurality of user devices, and determining a latency related to the video presentation for each of the plurality of user devices, resulting in a group of latencies being determined. The operations also comprise identifying a high-latency user device of the plurality of user devices; a particular latency of the group of latencies corresponding to the high-latency user device is greater than other latencies of the group of latencies corresponding to other user devices of the plurality of user devices. The operations further comprise analyzing field of view (FoV) information of each of the other user devices; predicting, based on the analyzing, a field of view of the high-latency user device; generating, in accordance with the predicting, a predicted viewing map for the high-latency user device; and adjusting the video presentation for the high-latency user device based on the predicted viewing map. The predicted viewing map comprises a first region outside the predicted field of view of the high-latency viewing device and a second region outside the predicted field of view of the high-latency viewing device; video data corresponding to at least one of the first region and the second region is provided at a quality different from that of video data corresponding to the predicted field of view for the high-latency user device.

One or more aspects of the subject disclosure include a machine-readable storage medium comprising executable instructions that, when executed by a processing system including a processor, facilitate performance of operations.

The operations comprise providing a video presentation over a network for viewing at a plurality of user devices, and determining a latency related to the video presentation for each of the plurality of user devices, resulting in a group of latencies being determined. The operations also comprise identifying a high-latency user device of the plurality of user devices; a particular latency of the group of latencies corresponding to the high-latency user device is greater than other latencies of the group of latencies corresponding to other user devices of the plurality of user devices. The operations further comprise analyzing field of view (FoV) information of each of the other user devices; predicting, based on the analyzing, a field of view of the high-latency user device; generating, in accordance with the predicting, a predicted viewing map for the high-latency user device; and adjusting the video presentation for the high-latency user device based on the predicted viewing map. The predicted viewing map comprises a plurality of regions outside the predicted field of view of the high-latency viewing device; video data corresponding to at least one of the plurality of regions is provided at a quality less than that of video data corresponding to the predicted field of view for the high-latency user device.

Referring now to FIG. 1, a block diagram is shown illustrating an example, non-limiting embodiment of a communications network 100 in accordance with various aspects described herein. As described further herein, images of a scene can be processed and distributed using various features of communications network 100 as a panoramic video presentation to viewer devices. Network 100 can include processing systems for obtaining content, generating and storing versions of content, configuring and delivering presentations of content, and providing alternate presentation versions based on audience reactions, as detailed below. In particular, a communications network 125 provides broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
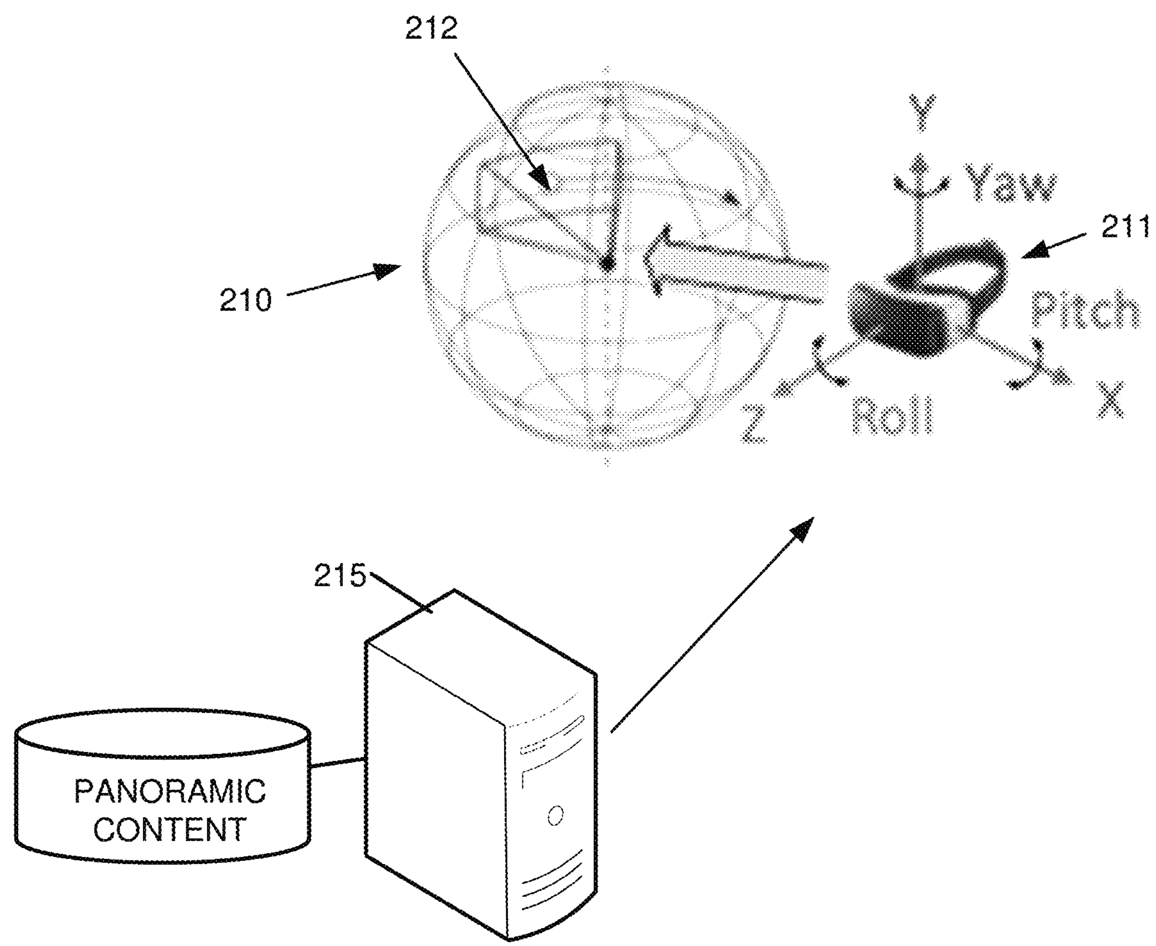
FIG. 2A schematically illustrates a user's limited field of view when experiencing a panoramic or immersive (360°) video presentation, in accordance with various aspects described herein.

FIG. 2A is a block diagram illustrating an example, non-limiting embodiment 201 of a system functioning within the communication network of FIG. 1 and in accordance with various aspects described herein. As shown in FIG. 2A, a 360° video (also known as an immersive video) is recorded by omnidirectional cameras or a camera array which captures all 360 degrees of a scene that can be wrapped onto a 3D sphere 210. In some embodiments, less than 360 degrees of a scene may be presented; as used herein, "panoramic" can refer to a video presentation of either a full 360° or less than 360°. The video can be watched using a smartphone or a specialized device, such as a virtual reality (VR) headset 211.

A viewer located at the center of sphere 210 and wearing headset 211 can adjust his/her orientation by changing the pitch, roll and yaw, which correspond to rotating about the X, Y and Z axes respectively. A processing system 215 that includes a video server can transmit image content to headset 211 based on the orientation and the user's field of view (FoV) 212. The FoV defines the extent of the observable area for the viewer; the FoV can be determined according to parameters of the VR headset. Changes in the FoV can be determined from changes in the orientation, which generally can be inferred from the viewer's head movements.

Figure 2B:
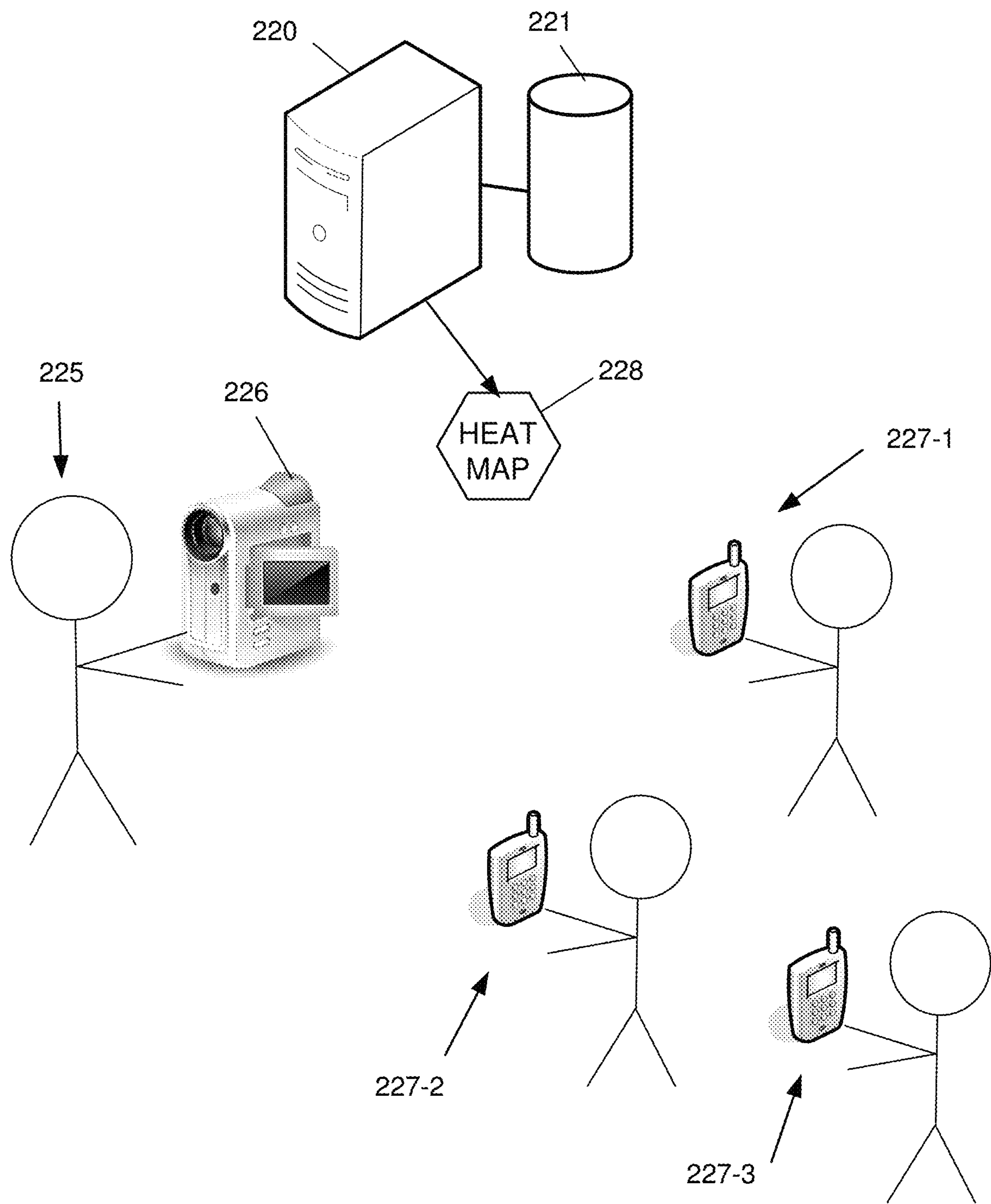
FIG. 2B schematically illustrates an example, non-limiting embodiment of a system functioning within the communication network of FIG. 1 and delivering live video content to users who receive the content with different latencies, in accordance with various aspects described herein.

FIG. 2B schematically illustrates an example, non-limiting embodiment 202 of a system functioning within the communication network of FIG. 1 in which video content is provided to viewers, in accordance with various aspects described herein. In this embodiment, a system user 225 can operate a camera 226 to record a video program, and transmit image data to processing system 220. The processing system in this embodiment includes an audio/video server that delivers image content to viewing devices 227-1, 227-2, 227-3.

If the program has been previously viewed (for example, the image data has been stored in storage device 221 and transmitted to viewers on demand), the processing system can learn from past viewings which portion of the 360° sphere was within the viewers' FoV at various times during the program. With this historical data, the processing system can construct a heat map 228 of the program for a viewer or a group of viewers, showing the probable location of the FoV during the current viewing. This permits the processing system to serve image content in the predicted FoV with maximum quality, while content outside the predicted FoV could either be served at lower quality or not served.

If the program is presented live, historical data is generally not available to construct a heat map. However, a heat map can be constructed to improve the experience for a viewer who is also experiencing latency, as detailed below.

Figure 2C:
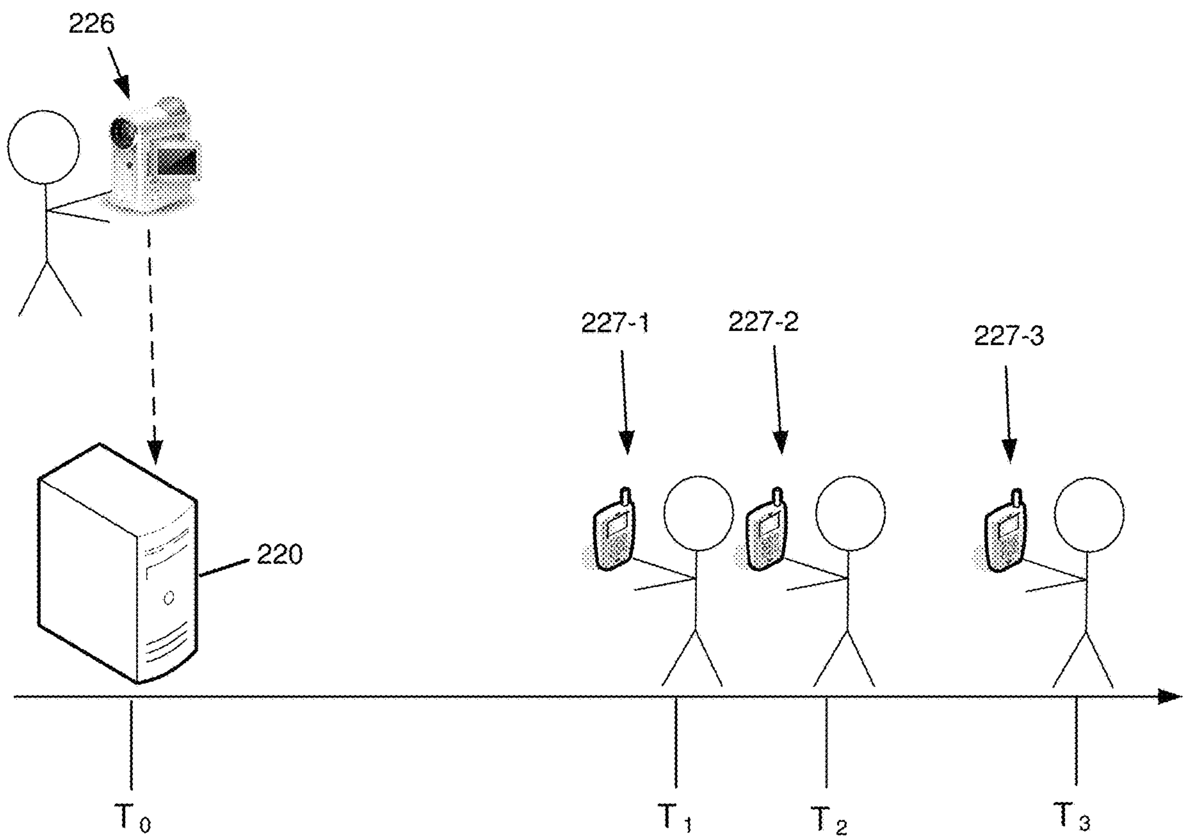
FIG. 2C schematically illustrates an example, non-limiting embodiment of a system functioning within the communication network of FIG. 1, in which users' unequal latencies are depicted on a timeline, in accordance with various aspects described herein.

FIG. 2C schematically illustrates an example, non-limiting embodiment 203 of a system functioning within the communication network of FIG. 1, in which live video content is received by viewers with different latencies. As shown in the timeline in FIG. 2C, content recorded at camera 226 is processed by system 220 and served to viewers at time $T_0$. The content is received by different viewer devices 227-1, 227-2, 227-3 at different times $T_1$, $T_2$, $T_3$. The latencies for these viewer devices (that is, the time differences $T_1-T_0$, $T_2-T_0$, $T_3-T_0$ respectively) are, in general, unequal. This latency inequality between devices can be due to several factors, including bandwidth variations, different device capabilities, server prioritization rules, etc.

In this embodiment, a group of viewing devices receiving the live video program is identified, and the latency is determined for each device. Devices receiving the video with greater latency (for example, device 227-3 in FIG. 2C) can benefit from video delivery optimization based on the viewing patterns of other devices with lower latency (for example, devices 227-1 and 227-2 in FIG. 2C). In particular, viewing data for the lower-latency devices can be used to predict the FoV for the higher-latency devices. This in turn permits higher-quality content to be served to the higher-latency devices.

In an embodiment, a prediction algorithm executing on system 220 can have as inputs FoV data from the lower-latency devices; data regarding movement (e.g., trajectory and speed) of one or more objects in the FoV; and/or data regarding head movements of users of the lower-latency devices. The prediction algorithm can then predict the FoV for the higher-latency device(s). In this embodiment, the FoV prediction for the higher-latency device(s) is performed periodically, at predetermined intervals of time. In another embodiment, the FoV prediction is performed at an interval determined by the viewers' head movements, with faster or more sudden head movements indicating a need for a shorter interval. In another embodiment, the FoV prediction is performed at an interval based on the program (for example, after a predetermined number of video frames, or according to a speed of an object appearing in the FoV of the lower-latency devices).

In the embodiment shown in FIG. 2C, a FoV prediction for device 227-3 can be based on viewing data for devices 227-2 and 227-1, while a FoV prediction for device 227-2 is based on viewing data for device 227-1. It will be appreciated that, with regard to predicting FoV and thus enabling higher-quality content delivery, a greater latency inequality provides greater benefits in accuracy and reliability of the predicted FoV.

Furthermore, it will be appreciated that the group of devices receiving live video can be divided into as many subgroups as desired. In each subgroup in which latency inequality occurs, the FoV for the higher-latency device can be predicted based on the FoV for the lower-latency devices (that is, any devices in the subgroup with lower latency than the device for which the FoV is predicted).

More generally, the FoV for any device experiencing a given level of latency (that is, a given delay time) can be predicted using the FoV for any device (or group of devices) experiencing a lower level of latency (that is, a shorter delay time).

The predicted FoV for the higher-latency devices can also be used to construct a heat map for the live video program. In an embodiment, the program is stored (for example, at storage device 221) in addition to being delivered to viewers' devices 227-1, 227-2, 227-3, and the heat map is also stored; this heat map can then be used to predict FoV in a subsequent viewing of the program, and refined for use in additional viewings.

Figure 2D:
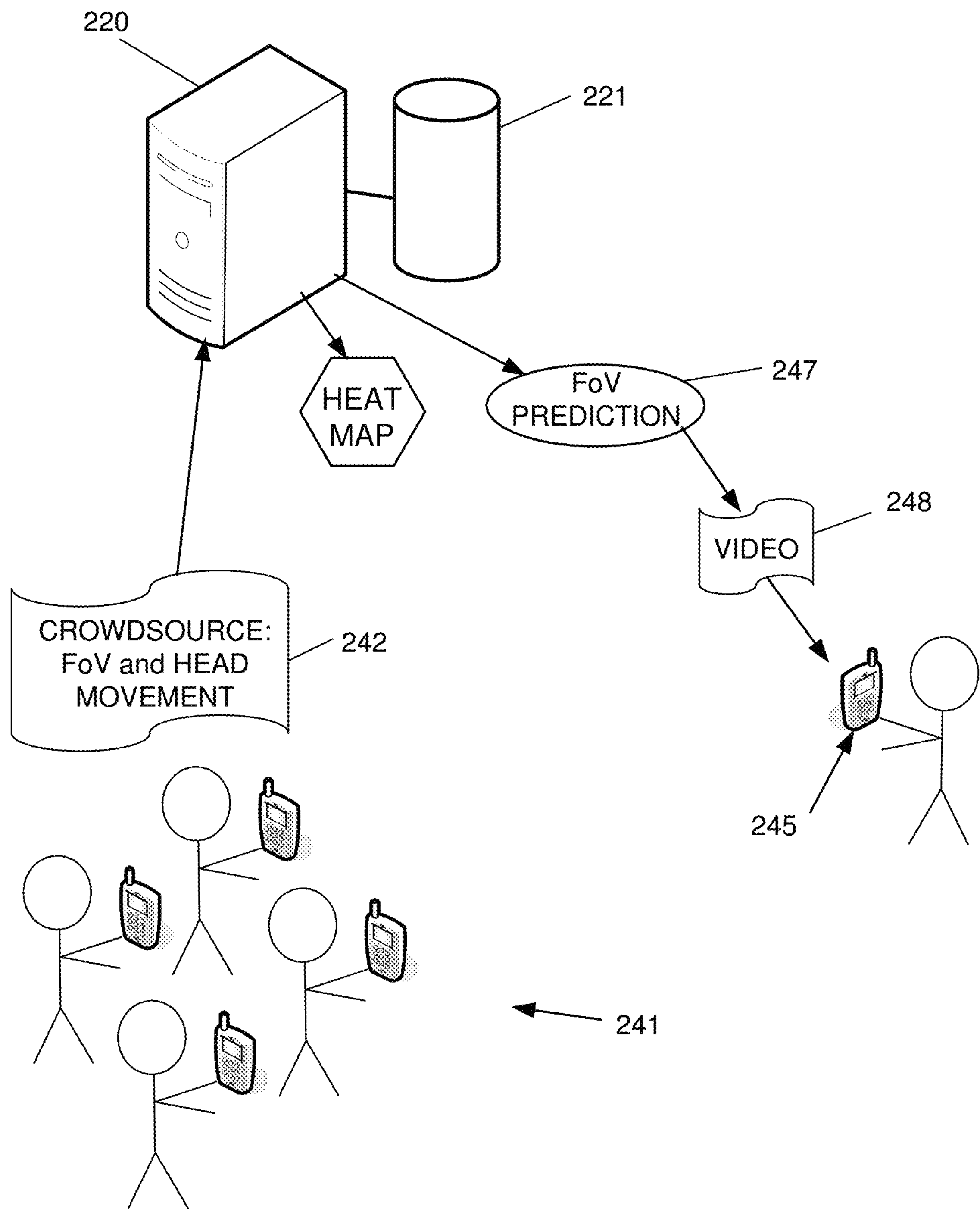
FIG. 2D schematically illustrates an example, non-limiting embodiment of a system functioning within the communication network of FIG. 1, in which a user experiencing relatively high latency receives video content based on a predicted field of view, in accordance with various aspects described herein.

FIG. 2D schematically illustrates an example, non-limiting embodiment 204 of a system functioning within the communication network of FIG. 1, in which latency inequality between a target device and a group of other devices in a live video program is used to predict the FoV for the target device, in accordance with various aspects described herein. In this embodiment, a group of viewer devices is identified where device 245 experiences higher latency than any of the other devices 241. The processing system 220 obtains and aggregates FoV and head movement data for the devices 241—that is, the data for predicting the FoV for device 245 is crowdsourced. The processing system generates a FoV prediction 247 for the higher-latency device 245, and a heat map for the live video program. The processing system is thus enabled to deliver video content 248 with improved quality for the predicted FoV.

Figure 2E:
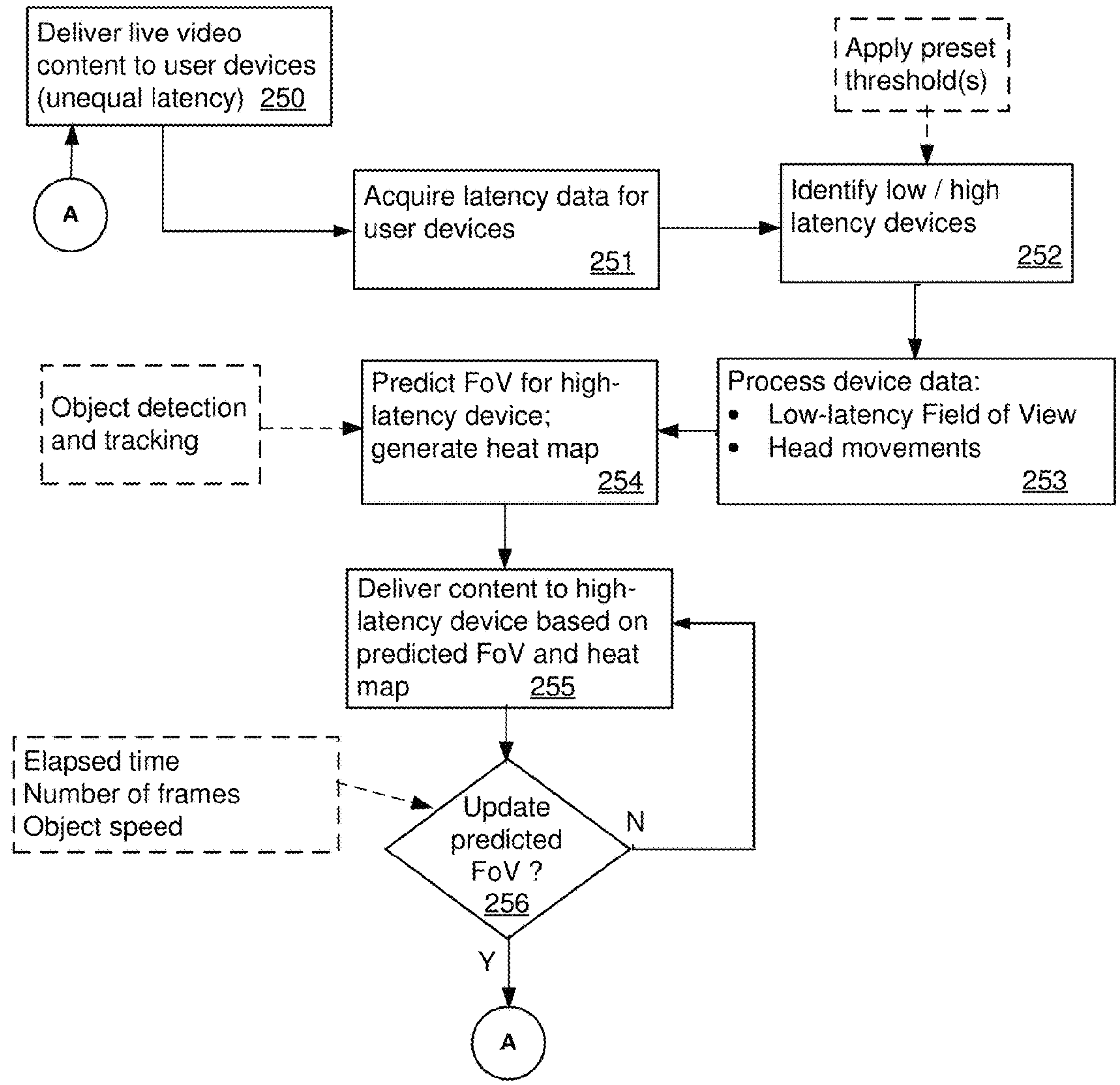
FIG. 2E is a flowchart depicting an illustrative embodiment of a method in accordance with various aspects described herein.

FIG. 2E is a flowchart 205 depicting an illustrative embodiment of a method in accordance with various aspects described herein. The method relates to a system providing FoV prediction for a viewing device with relatively high latency, and for delivering live video content to that device in accordance with the prediction.

In step 250, the system delivers live video content to a group of viewer devices; in this embodiment, the various devices experience unequal latency. The system acquires data regarding the latency experienced by the devices (step 251) and identifies one or more devices having relatively high latency (step 252). In an embodiment, a predetermined threshold is used to distinguish low-latency devices from high-latency devices. In another embodiment, the group of devices is divided into subsets each having a predetermined number of devices, with the device having the highest latency in the subset treated as a high-latency device.

The system then processes FoV and head movement data for the devices (step 253), and generates a FoV prediction for the high-latency device (step 254). In this embodiment, the system also generates a heat map for the live video program. The system then delivers video content to the high-latency device (step 255) based on the predicted FoV. In an embodiment, images falling outside the predicted FoV are delivered with lower quality than those within the predicted FoV. In another embodiment, images within the predicted FoV are delivered with maximum quality, while images outside the predicted FoV are not delivered.

The system then determines whether the predicted FoV should be updated (step 256), based on one or more of an elapsed time since the last prediction, a number of video frames displayed since the last prediction, or a speed of an object moving within the predicted FoV.

While for purposes of simplicity of explanation, the respective processes are shown and described as a series of blocks in FIGS. 2D-2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
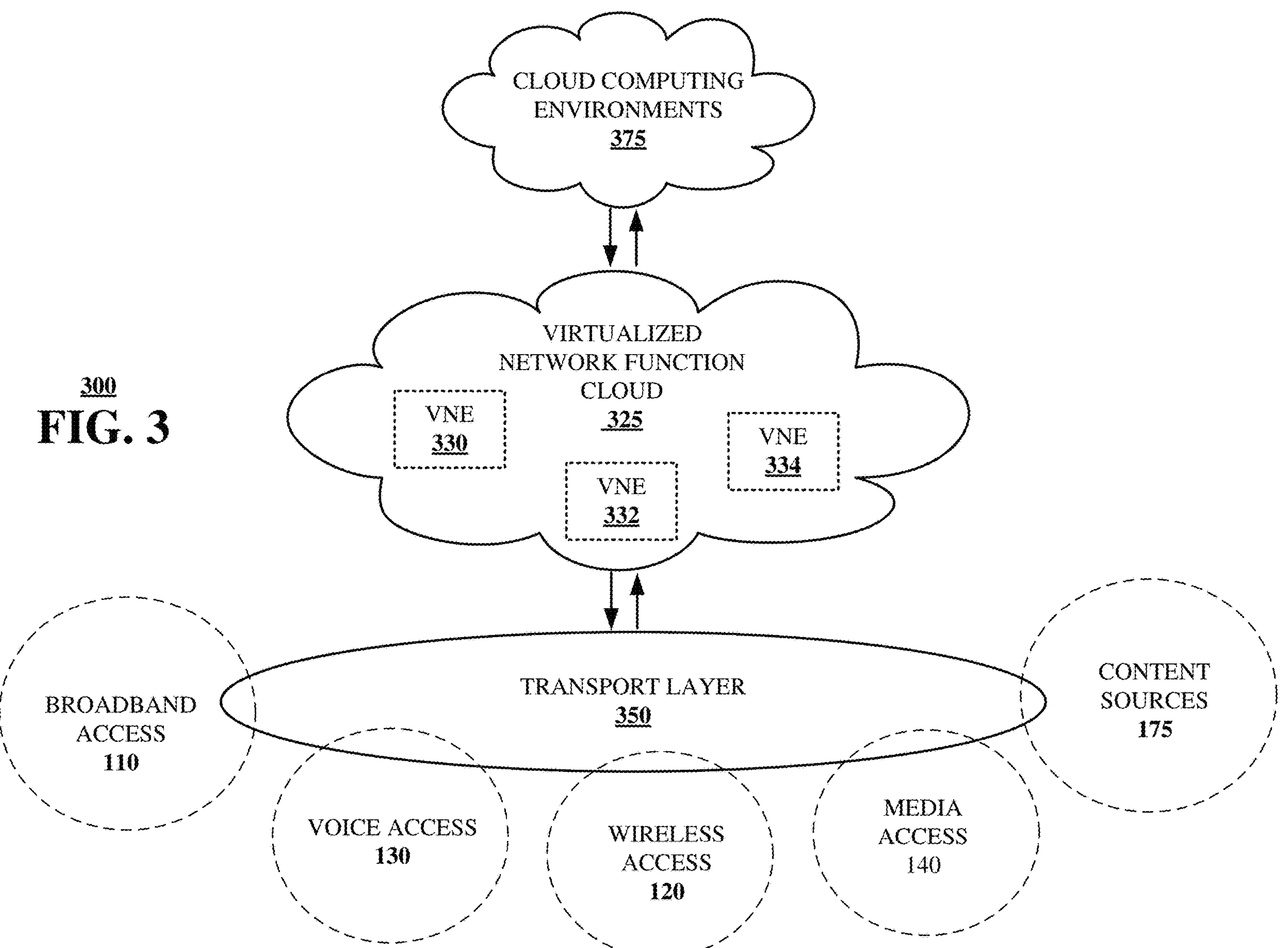
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. Network 300 includes virtual elements that can perform the above-described operations of obtaining content, generating and storing versions of content, configuring presentation of content versions, and providing alternate presentation versions based on audience reactions. In particular, virtualized communication network 300 can be used to implement some or all of the subsystems and functions of communication network 100, the subsystems and functions of systems 201-203, and methods 204-205 presented in FIGS. 1, 2A, 2B, 2C, 2D and 2E.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The VNEs 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These VNEs 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
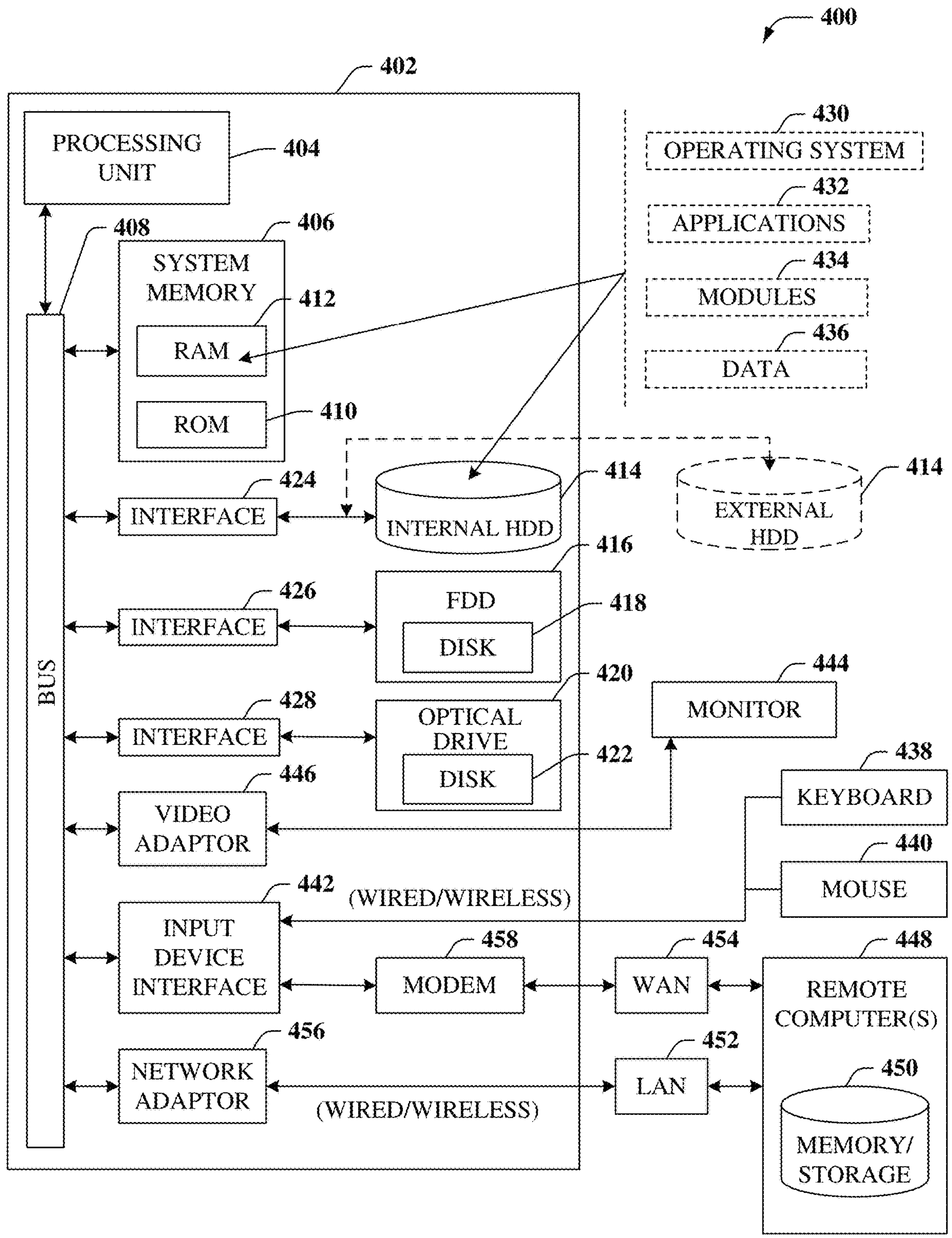
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the local network 452 through a wired and/or wireless communication network interface or adapter 456. The adapter 456 can facilitate wired or wireless communication to the LAN 452, which can also comprise a wireless AP disposed thereon for communicating with the wireless adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
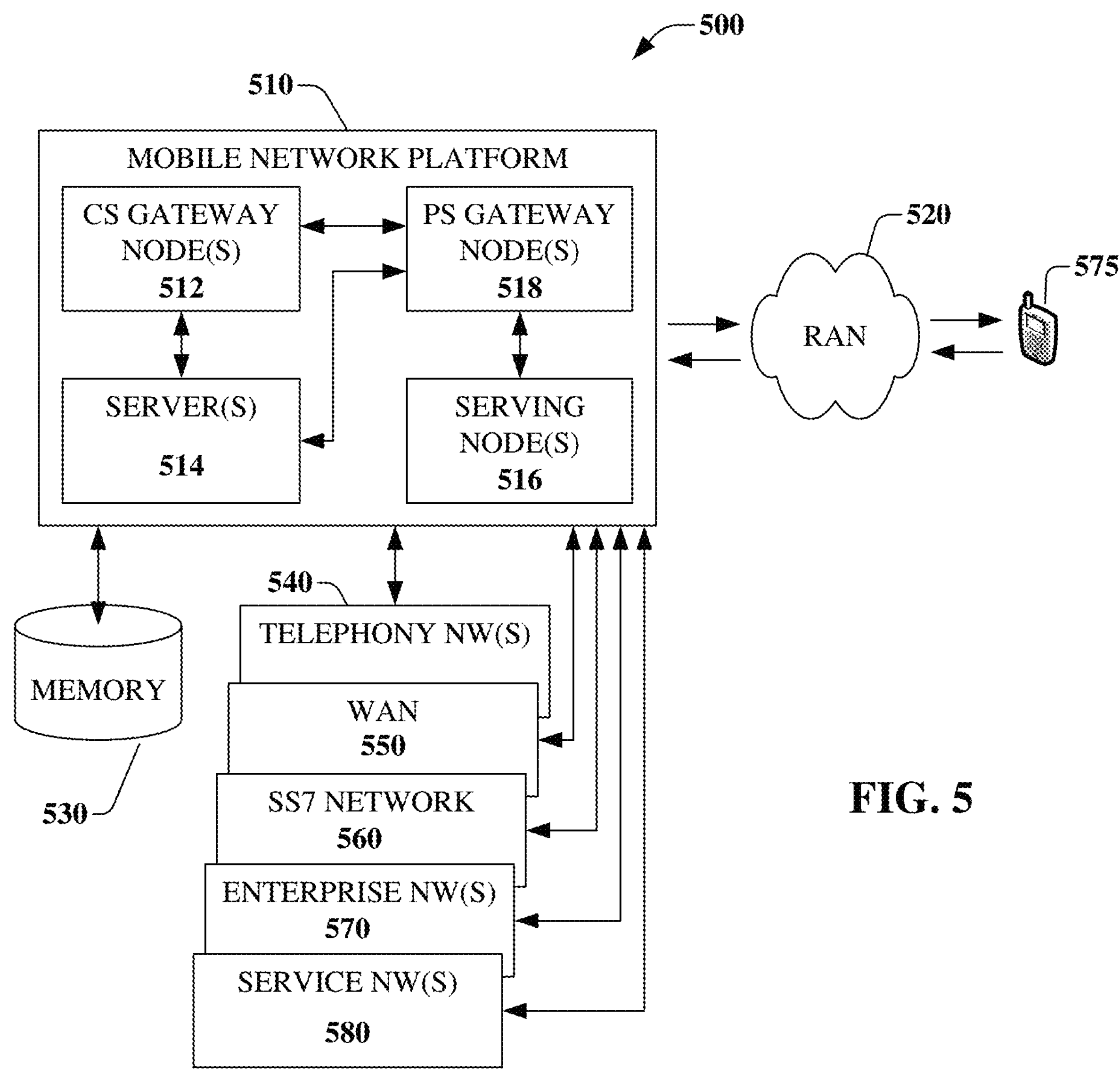
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices such as radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WAN 550 and enterprise network(s) 570 can embody, at least in part, a service network(s) like IP multimedia subsystem (IMS). Based on radio technology layer(s) available in technology resource(s) of radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of macro wireless network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
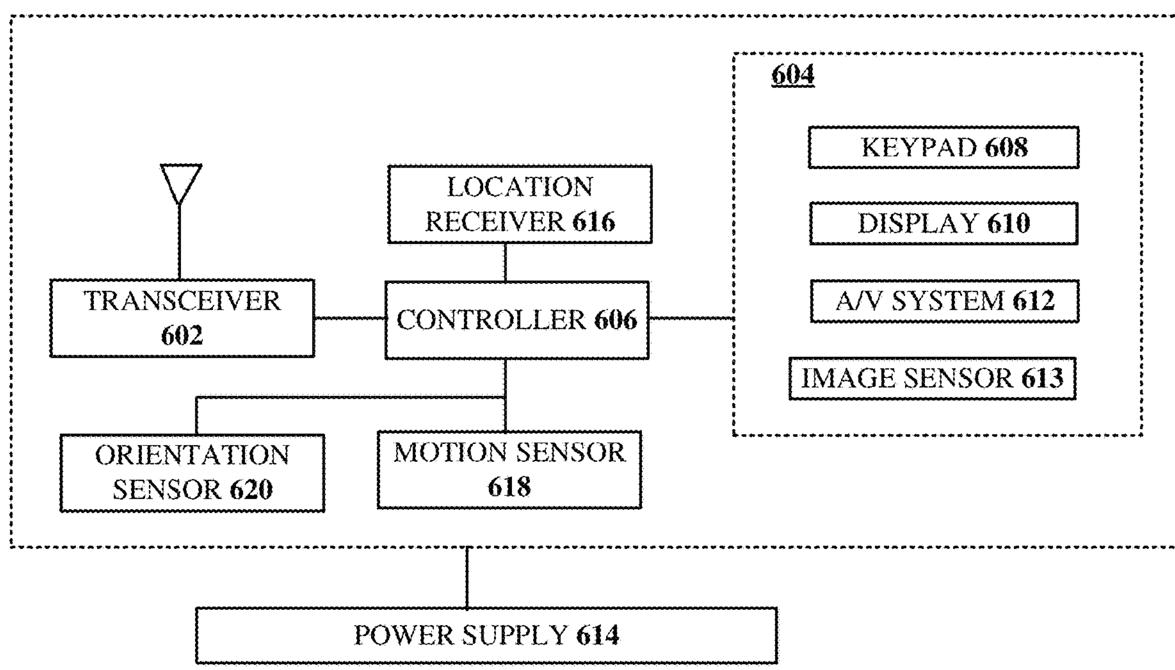
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method comprising:

providing, by a processing system including a processor, a video presentation over a network for viewing at a plurality of user devices;

determining, by the processing system, a latency related to the video presentation for each of the plurality of user devices resulting in a group of latencies being determined;

identifying, by the processing system, a first user device of the plurality of user devices having a first latency greater than other latencies of the group of latencies corresponding to other user devices of the plurality of user devices;

generating, by the processing system, a first predicted viewing map for the first user device, based on data from the other user devices of the plurality of user devices, the data comprising field of view (FoV) data from the other user devices of the plurality of user devices and user head movement data associated with users of the other user devices of the plurality of user devices, wherein the generating the first predicted viewing map for the first user device is performed at an interval that is based on the user head movement data associated with the users of the other user devices, and wherein the interval is shorter if the user head movement data indicates faster head movements for the users of the other user devices; and adjusting, by the processing system, the video presentation for the first user device based on the first predicted viewing map.

2. The method of claim 1, wherein the generating comprises predicting a field of view (FoV) for the first user device to obtain a predicted FoV, and wherein the adjusting comprises omitting video data corresponding to a first region outside the predicted FoV from the video presentation for the first user device.

3. The method of claim 2, wherein the user head movement data comprises tracking data for an object depicted in the video presentation, and wherein the predicting the FoV comprises predicting movement of the object.

4. The method of claim 2, wherein the first predicted viewing map comprises a second region outside the predicted FoV, and wherein, in accordance with the adjusting, video data corresponding to the second region is included in the video presentation and provided at a quality less than that of video data corresponding to the predicted FoV.

5. The method of claim 2, wherein the predicted FoV is updated based on an elapsed time since a prior prediction, a number of video frames presented since the prior prediction, a speed of an object moving within the predicted FoV, or a combination thereof.

6. The method of claim 2, wherein the interval is shorter if the user head movement data indicates sudden or instantaneous head movements for the users of the other user devices.

7. The method of claim 1, wherein each of the plurality of user devices comprises a virtual reality (VR) headset, the method further comprising:

identifying, by the processing system, a second user device of the plurality of user devices having a second latency less than the first latency and greater than a third latency corresponding to a third user device of the plurality of user devices;

generating, by the processing system, a second predicted viewing map for the second user device, based on data from the third user device and not based on data from the first user device, the data from the third user device comprising FoV data from the third user device and user head movement data associated with a user of the third user device; and adjusting, by the processing system, the video presentation for the second user device based on the second predicted viewing map, wherein a greater difference between the first latency and the other latencies enables higher accuracy in the generating of the first predicted viewing map, such that the adjusting the video presentation for the first user device results in higher quality content being provided for the first user device, and wherein a greater difference between the second latency and the third latency enables higher accuracy in the generating of the second predicted viewing map, such that the adjusting the video presentation for the second user device results in higher quality content being provided for the second user device.

8. The method of claim 1, wherein the video presentation comprises a 360° video presentation.

9. The method of claim 1, wherein the identifying comprises comparing each of the group of latencies with a latency threshold, and wherein the plurality of user devices comprises a plurality of high-latency user devices each having a latency exceeding the latency threshold.

10. A device comprising:

a processing system including a processor; and a memory that stores executable instructions that, when executed by the processing system, facilitate performance of operations comprising:

providing a live video presentation over a network for viewing at a plurality of user devices;

determining a latency related to the live video presentation for each of the plurality of user devices resulting in a group of latencies being determined;

identifying a first user device of the plurality of user devices having a first latency greater than other latencies of the group of latencies corresponding to other user devices of the plurality of user devices;

generating a first predicted viewing map for the first user device, based on data from the other user devices of the plurality of user devices, the data comprising field of view (FoV) data from the other user devices of the plurality of user devices and user head movement data associated with users of the other user devices of the plurality of user devices, wherein the generating the first predicted viewing map for the first user device is performed at an interval that is based on the user head movement data associated with the users of the other user devices, and wherein the interval is shorter if the user head movement data indicates faster head movements for the users of the other user devices; and adjusting the live video presentation for the first user device based on the first predicted viewing map.

11. The device of claim 10, wherein the generating comprises predicting a field of view (FoV) for the first user device to obtain a predicted FoV, and wherein the adjusting comprises omitting video data corresponding to a first region outside the predicted FoV from the live video presentation for the first user device.

12. The device of claim 11, wherein the user head movement data comprises tracking data for an object depicted in the live video presentation, and wherein the predicting the FoV comprises predicting movement of the object.

13. The device of claim 11, wherein the first predicted viewing map comprises a second region outside the predicted FoV, and wherein, in accordance with the adjusting, video data corresponding to the second region is included in the live video presentation and provided at a quality less than that of video data corresponding to the predicted FoV.

14. The device of claim 10, wherein each of the plurality of user devices comprises a virtual reality (VR) headset, and wherein the operations further comprise:

identifying a second user device of the plurality of user devices having a second latency less than the first latency and greater than a third latency corresponding to a third user device of the plurality of user devices;

generating a second predicted viewing map for the second user device, based on data from the third user device and not based on data from the first user device, the data from the third user device comprising FoV data from the third user device and user head movement data associated with a user of the third user device; and adjusting the live video presentation for the second user device based on the second predicted viewing map, wherein a greater difference between the first latency and the other latencies enables higher accuracy in the generating of the first predicted viewing map, such that the adjusting the live video presentation for the first user device results in higher quality content being provided for the first user device, and wherein a greater difference between the second latency and the third latency enables higher accuracy in the generating of the second predicted viewing map, such that the adjusting the live video presentation for the second user device results in higher quality content being provided for the second user device.

15. The device of claim 10, wherein the live video presentation comprises a 360° video presentation.

16. A non-transitory machine-readable medium comprising executable instructions that, when executed by a processing system including a processor, facilitate performance of operations comprising:

providing a video presentation over a network for viewing at a plurality of user devices;

determining a latency related to the video presentation for each of the plurality of user devices resulting in a group of latencies being determined;

identifying a first user device of the plurality of user devices having a first latency greater than other latencies of the group of latencies, the other latencies corresponding to other user devices of the plurality of user devices and exceeding a latency threshold;

generating a first predicted viewing map for the first user device, based on data from the other user devices of the plurality of user devices, the data comprising field of view (FoV) data from the other user devices of the plurality of user devices and user head movement data associated with users of the other user devices of the plurality of user devices, wherein the generating the first predicted viewing map for the first user device is performed at an interval that is based on the user head movement data associated with the users of the other user devices, and wherein the interval is shorter if the user head movement data indicates faster head movements for the users of the other user devices; and adjusting the video presentation for the first user device based on the first predicted viewing map.

17. The non-transitory machine-readable medium of claim 16, wherein the generating comprises predicting a field of view (FoV) for the first user device to obtain a predicted FoV, and wherein the adjusting comprises omitting video data corresponding to a first region outside the predicted FoV from the video presentation for the first user device.

18. The non-transitory machine-readable medium of claim 17, wherein the user head movement data comprises tracking data for an object depicted in the video presentation, and wherein the predicting the FoV comprises predicting movement of the object.

19. The non-transitory machine-readable medium of claim 17, wherein the first predicted viewing map comprises a second region outside the predicted FoV, and wherein, in accordance with the adjusting, video data corresponding to the second region is included in the video presentation and provided at a quality less than that of video data corresponding to the predicted FoV.

20. The non-transitory machine-readable medium of claim 16, wherein the operations further comprise:

identifying a second user device of the plurality of user devices having a second latency less than the first latency and greater than a third latency corresponding to a third user device of the plurality of user devices;

generating a second predicted viewing map for the second user device, based on data from the third user device and not based on data from the first user device, the data from the third user device comprising FoV data from the third user device and user head movement data associated with a user of the third user device; and adjusting the video presentation for the second user device based on the second predicted viewing map, wherein a greater difference between the first latency and the other latencies enables higher accuracy in the generating of the first predicted viewing map, such that the adjusting the video presentation for the first user device results in higher quality content being provided for the first user device, and wherein a greater difference between the second latency and the third latency enables higher accuracy in the generating of the second predicted viewing map, such that the adjusting the video presentation for the second user device results in higher quality content being provided for the second user device.

* * * * *